United States Patent
Zhang et al.

(10) Patent No.: US 8,862,131 B2
(45) Date of Patent: Oct. 14, 2014

(54) METHOD AND APPARATUS FOR HANDOVER PREPARATION

(71) Applicant: Huawei Technologies Co., Ltd., Shenzhen (CN)

(72) Inventors: Tao Zhang, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 13/800,512

(22) Filed: Mar. 13, 2013

(65) Prior Publication Data

US 2013/0196666 A1 Aug. 1, 2013

Related U.S. Application Data

(63) Continuation of application No. PCT/CN2011/075358, filed on Jun. 3, 2011.

(30) Foreign Application Priority Data

Sep. 14, 2010 (CN) .......................... 2010 1 0280937

(51) Int. Cl.
*H04W 36/00* (2009.01)

(52) U.S. Cl.
CPC ...... *H04W 36/0005* (2013.01); *H04W 36/0066* (2013.01)
USPC ............................ 455/436; 455/438; 455/439

(58) Field of Classification Search
USPC ............ 455/422.1, 432.1, 436–444; 370/328, 370/329, 331–333
See application file for complete search history.

(56) References Cited

U.S. PATENT DOCUMENTS

| 8,014,357 B2* | 9/2011 | Xia et al. ....................... 370/331 |
| 8,406,191 B2* | 3/2013 | Dynarski et al. ............... 370/331 |
| 2010/0167744 A1* | 7/2010 | Grob-Lipski et al. ........ 455/436 |

FOREIGN PATENT DOCUMENTS

| CN | 101175304 A | 5/2008 |
| CN | 101384068 A | 3/2009 |
| CN | 101534533 A | 9/2009 |
| CN | 101651971 A | 2/2010 |
| CN | 101730032 A | 6/2010 |

OTHER PUBLICATIONS

Copy of Written Opinion of the International Searching Authority issued in corresponding PCT Patent Application No. PCT/CN2011/075358, mailed Sep. 15, 2011.
Copy of International Search Report issued in corresponding PCT Patent Application No. PCT/CN2011/075358, mailed Sep. 15, 2011.

* cited by examiner

*Primary Examiner* — Ajit Patel
(74) *Attorney, Agent, or Firm* — Brinks Gilson & Lione (57) ABSTRACT

The present invention discloses a method and an apparatus for handover preparation. The method includes: receiving, by a DeNB, a first handover request message sent by an RN; obtaining, by the DeNB, the first target cell identifier, and instructing a base station to which the first target cell belongs to perform handover preparation in the first target cell; receiving, by the DeNB, a second handover request message sent by the RN; and when a base station to which the second target cell belongs is different from the base station to which the first target cell belongs, instructing, by the DeNB, the base station to which the second target cell belongs to perform handover preparation in the second target cell. Embodiments of the present invention further disclose corresponding apparatuses.

20 Claims, 8 Drawing Sheets

METHOD AND APPARATUS FOR HANDOVER PREPARATION

CROSS-REFERENCE TO RELATED APPLICATIONS

This application is a continuation of International Application No. PCT/CN2011/075358, filed on Jun. 3, 2011, which claims priority to Chinese Patent Application No. 201010280937.0, filed on Sep. 14, 2010, both of which are hereby incorporated by reference in their entireties.

FIELD OF THE INVENTION

The present invention relates to communication technologies, and in particular, to a handover preparation technology.

BACKGROUND OF THE INVENTION

In a conventional network, there is a direct wireless connection between a base station (E-UTRAN Node B, eNB) and a user equipment (User Equipment, UE), namely, the network is a single-hop network. With the development of communication technologies, a relay technology is introduced. To be specific, one or more relay stations (Relay Node, RN) are added between the eNB and the UE to forward a radio signal, sent by the eNB, one or more times, so that the signal finally arrives at the UE. For example, an RN may divide a radio link between the eNB and the UE into a radio link from the eNB to the RN and a radio link from the RN to the UE, so that a link with poor quality can be replaced with two links with good quality to obtain higher link capacity and better coverage.

By taking an LTE technology as an example, eNBs may be connected through an X2 interface. After an RN is introduced, from the perspective of the X2 interface, the RN has an X2 interface only with its donor base station (Donor eNB, DeNB), and the DeNB has X2 interfaces with other eNBs. In other words, all X2 messages transferred between the RN and other eNBs need to be processed and forwarded by the DeNB.

In the prior art, the RN, as a base station, can provide services for the UE. However, the prior art does not provide an effective technical solution which can enable the DeNB to correctly process a handover request message sent by the RN so that a handover preparation process can proceed smoothly.

SUMMARY OF THE INVENTION

Embodiments of the present invention provide a method and an apparatus for handover preparation, which solve the problem in the prior art that a DeNB cannot correctly process a handover request message sent by an RN.

To solve the preceding technical problem, embodiments of the present invention provide the following technical solutions:

A method for handover preparation includes:
receiving, by a donor base station (DeNB), a first handover request message sent by a relay station (RN), where the first handover request message carries a first target cell identifier and a first user equipment (UE) identifier, where the first target cell identifier is used for identifying a first target cell;
obtaining, by the DeNB, the first target cell identifier, and instructing a base station to which the first target cell belongs to perform handover preparation in the first target cell;
receiving, by the DeNB, a second handover request message sent by the RN, where the second handover request message carries a second target cell identifier and a second UE identifier, where the second target cell identifier is used for identifying a second target cell; and
obtaining, by the DeNB, the second target cell identifier, and when a base station to which the second target cell belongs is different from the base station to which the first target cell belongs, instructing, by the DeNB, the base station to which the second target cell belongs to perform handover preparation in the second target cell.

A method for handover preparation includes:
sending, by a relay station (RN), a first handover request message to a donor base station (DeNB), where the first handover request message carries a first user equipment identifier and a first target cell identifier, where the first target cell identifier is used for identifying a first target cell to request the DeNB to send a third handover request message to a base station to which the first target cell belongs, and the first user equipment identifier is used for identifying a user equipment (UE); and
sending, by the RN, a second handover request message to the DeNB, where the second handover request message carries a second user equipment identifier and a second target cell identifier, where the second target cell identifier is used for identifying a second target cell to request the DeNB to send a fourth handover request message to a base station to which the second target cell belongs, where the second user equipment identifier is used for identifying the UE and is different from the first user equipment identifier, and the base station to which the first target cell belongs is different from the base station to which the second target cell belongs.

A method for handover preparation includes:
receiving, by a donor base station (DeNB), a first handover request message sent by a relay station (RN), where the first handover request message carries a user equipment identifier and a handover target cell identifier list, where the handover target cell identifier list includes at least two different target cell identifiers, where base stations to which target cells indicated by the at least two different target cell identifiers belong are different base stations; and
sending, by the DeNB, handover request messages to the base stations to which the target cells indicated by the target cell identifiers in the handover target cell identifier list belong.

A donor base station includes:
a first receiving unit, configured to receive a first handover request message sent by a relay station (RN), where the first handover request message carries a first target cell identifier and a first user equipment (UE) identifier, where the first target cell identifier is used for identifying a first target cell;
a first processing unit, configured to obtain the first target cell identifier after the first receiving unit receives the first handover request message, and instruct a base station to which the first target cell belongs to perform handover preparation in the first target cell;
a second receiving unit, configured to receive a second handover request message sent by the RN, where the second handover request message carries a second target cell identifier and a second UE identifier, where the second target cell identifier is used for identifying a second target cell; and
a first determining unit, configured to obtain the second target cell identifier after the second receiving unit receives the second handover request message, and when determining that a base station to which the second target cell indicated by the second target cell identifier belongs is different from the base station to which the first target cell indicated by the first target cell identifier obtained by the first processing unit belongs, instruct the base station to which the second target cell belongs to perform handover preparation in the second target cell.

A relay station includes:

a first sending unit, configured to send a first handover request message to a donor base station (DeNB), where the first handover request message carries a first user equipment identifier and a first target cell identifier, where the first target cell identifier is used for identifying a first target cell to request the DeNB to send a third handover request message to a base station to which the first target cell belongs, and the first user equipment identifier is used for identifying a user equipment (UE); and a second sending unit, configured to send a second handover request message to the DeNB after the first sending unit sends the first handover request message, where the second handover request message carries a second user equipment identifier and a second target cell identifier, where the second target cell identifier is used for identifying a second target cell to request the DeNB to send a fourth handover request message to a base station to which the second target cell belongs, where the second user equipment identifier is used for identifying the UE and is different from the first user equipment identifier, and the base station to which the first target cell belongs is different from the base station to which the second target cell belongs.

A donor base station includes:

a fifth receiving unit, configured to receive a first handover request message sent by a relay station RN, where the first handover request message carries a user equipment identifier and a handover target cell identifier list, where the handover target cell identifier list includes at least two different target cell identifiers, where base stations to which target cells indicated by the at least two different target cell identifiers belong are different base stations;

a parsing unit, configured to determine base stations indicated by the target cell identifiers in the handover target cell identifier list received by the fifth receiving unit; and a third sending unit, configured to send, according to a result of the parsing unit, handover request messages to the base stations to which the target cells indicated by the target cell identifiers in the handover target cell identifier list belong.

As can be seen from the above, in the implementation of embodiments of the present invention, after a DeNB receives a handover request sent by an RN, the DeNB can determine that a base station to which a second target cell belongs is different from a base station to which a first target cell belongs, and therefore can make proper determination for the handover request sent by the RN, so that handover can proceed smoothly, which solves the problem in the prior art that the DeNB cannot correctly process the handover request sent by the RN.

DETAILED DESCRIPTION OF THE EMBODIMENTS

The method and apparatus for handover are hereinafter described in detail.

Figure 1:
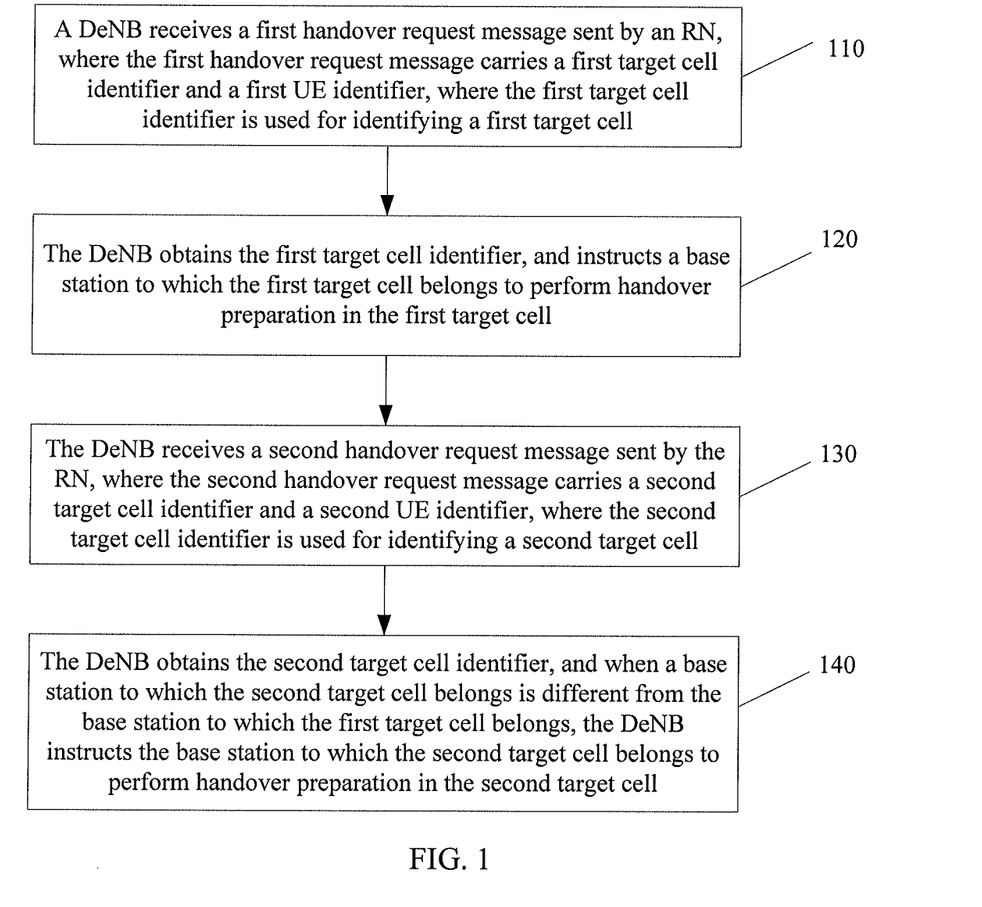
FIG. 1 is a flowchart of a method according to an embodiment of the present invention.

With reference to FIG. 1, the following describes in detail a method for handover preparation according to an embodiment of the present invention. As shown in FIG. 1, the method includes:

Step 110: A DeNB receives a first handover request message sent by an RN, where the first handover request message carries a first target cell identifier and a first UE identifier, where the first target cell identifier is used for identifying a first target cell.

In the embodiment of the present invention, if the RN sends two handover request messages to the DeNB in parallel, the first message may be referred to as a first handover request message, and the second message may be referred to as a second handover request message. Correspondingly, the UE identifier carried in the first handover request message may be referred to as a first UE identifier, and the target cell identifier carried in the first handover request message may be referred to as a first target cell identifier; the UE identifier carried in the second handover request message may be referred to as a second UE identifier, and the target cell identifier carried in the second handover request message may be referred to as a second target cell identifier.

Step 120: The DeNB obtains the first target cell identifier, and instructs a base station to which the first target cell belongs to perform handover preparation in the first target cell.

The DeNB obtains the first target cell identifier. When the base station to which the first target cell is a first target base station, the DeNB sends a third handover request message to the first target base station to request the first target base station to perform handover preparation in the first target cell. From the perspective of a handover process, in the subsequent detailed process, after the DeNB receives the first handover request message, the handover request message, sent by the DeNB to the base station to which the first target cell belongs, namely, a first target base station, may be referred to as a third handover request message; for example, the first target base station may be TeNB1 in the embodiment in FIG. 5.

The DeNB obtains the first target cell identifier, and when the base station to which the first target cell belongs is the DeNB, the DeNB performs handover preparation in the first target cell.

Step 130: The DeNB receives a second handover request message sent by the RN, where the second handover request message carries a second target cell identifier and a second UE identifier, where the second target cell identifier is used for identifying a second target cell.

Step 140: The DeNB obtains the second target cell identifier, and when a base station to which the second target cell belongs is different from the base station to which the first target cell belongs, the DeNB instructs the base station to which the second target cell belongs to perform handover preparation in the second target cell.

If the DeNB obtains the first target cell identifier in step 120, when the base station to which the first target cell belongs is a first target base station, the DeNB sends a third handover request message to the first target base station to request the first target base station to perform handover preparation in the first target cell. Then, when the base station to which the second target cell belongs is a second target base station, the DeNB sends a fourth handover request message to the second target base station to request the second target base station to perform handover preparation in the second target cell. In the subsequent detailed process, after the DeNB receives the second handover request message, the handover request message, sent by the DeNB to the base station to which the second target cell belongs, namely, a second target base station, may be referred to as a fourth handover request message; for example, the first target base station may be TeNB1 in the embodiment in FIG. 5, and the second target base station may be TeNB2 in FIG. 5.

Or, if the DeNB obtains the first target cell identifier in step 120, when the base station to which the first target cell belongs is a first target base station, the DeNB sends a third handover request message to the first target base station to request the first target base station to perform handover preparation in the first target cell. Then, when the base station to which the second target cell belongs is the DeNB, the DeNB performs handover preparation in the second target cell.

Or, if the DeNB obtains the first target cell identifier in step 120, when the base station to which the first target cell belongs is the DeNB, the DeNB performs handover preparation in the first target cell. Then, when the base station to which the second target cell belongs is a second target base station, the DeNB sends a fourth handover request message to the second target base station so that the second target base station performs handover preparation in the second target cell. For example, the second target base station may be TeNB2 in FIG. 9.

Step 140*b* may be further included: When the base station to which the second target cell belongs is the same as the base station to which the first target cell belongs and the second UE identifier is the same as the first UE identifier, the DeNB sends an error indication message to the RN.

If the DeNB obtains the first target cell identifier in step 120, when the base station to which the first target cell belongs is a first target base station, the DeNB sends a third handover request message to the first target base station to request the first target base station to perform handover preparation in the first target cell. Then, when the base station to which the second target cell belongs is also the first target base station, if the second UE identifier is the same as the first UE identifier, the DeNB regards it as an error and needs to send an error indication message to the RN.

Or, if the DeNB obtains the first target cell identifier in step 120, when the base station to which the first target cell belongs is the DeNB, the DeNB performs handover preparation in the first target cell. Then, when the base station to which the second target cell belongs is also the DeNB, if the second UE identifier is the same as the first UE identifier, the DeNB regards it as an error and needs to send an error indication message to the RN.

Step 140*c* may be further included: When the base station to which the second target cell belongs is the same as the base station to which the first target cell belongs, the DeNB instructs the base station to which the second target cell belongs to perform handover preparation in the second target cell.

Step 140*d* may be further included: When at least one of the base station to which the second target cell belongs and the base station to which the first target cell belongs is another target base station, the DeNB instructs the base station to which the second target cell belongs to perform handover preparation in the second target cell.

If the DeNB obtains the first target cell identifier in step 120, when the base station to which the first target cell belongs is a first target base station, the DeNB sends a third handover request message to the first target base station to request the first target base station to perform handover preparation in the first target cell. Then, when the base station to which the second target cell belongs is a second target base station, the DeNB sends a fourth handover request message to the second target base station to request the second target base station to perform handover preparation in the second target cell.

Or, if the DeNB obtains the first target cell identifier in step 120, when the base station to which the first target cell belongs is a first target base station, the DeNB sends a third handover request message to the first target base station to request the first target base station to perform handover preparation in the first target cell. Then, when the base station to which the second target cell belongs is also the first target base station, the DeNB sends a fourth handover request message to the first target base station to request the first target base station to perform handover preparation in the second target cell.

Or, if the DeNB obtains the first target cell identifier in step 120, when the base station to which the first target cell belongs is a first target base station, the DeNB sends a third handover request message to the first target base station to request the first target base station to perform handover preparation in the first target cell. Then, when the base station to which the second target cell belongs is the DeNB, the DeNB performs handover preparation in the second target cell.

Or, if the DeNB obtains the first target cell identifier in step 120, when the base station to which the first target cell belongs is the DeNB, the DeNB performs handover preparation in the first target cell. Then, when the base station to which the second target cell belongs is a second target base station, the DeNB sends a fourth handover request message to the second target base station so that the second target base station performs handover preparation in the second target cell.

As can be seen from the above, in the embodiment of the present invention, after using a new error check principle, the DeNB may effectively distinguish a valid handover request of the RN from an error behavior, so that the RN can request multiple target eNBs in parallel to perform handover preparation for a UE. Therefore, the handover success ratio of the UE rises, and unnecessary parallel processes between base stations may be effectively avoided.

Figure 2:
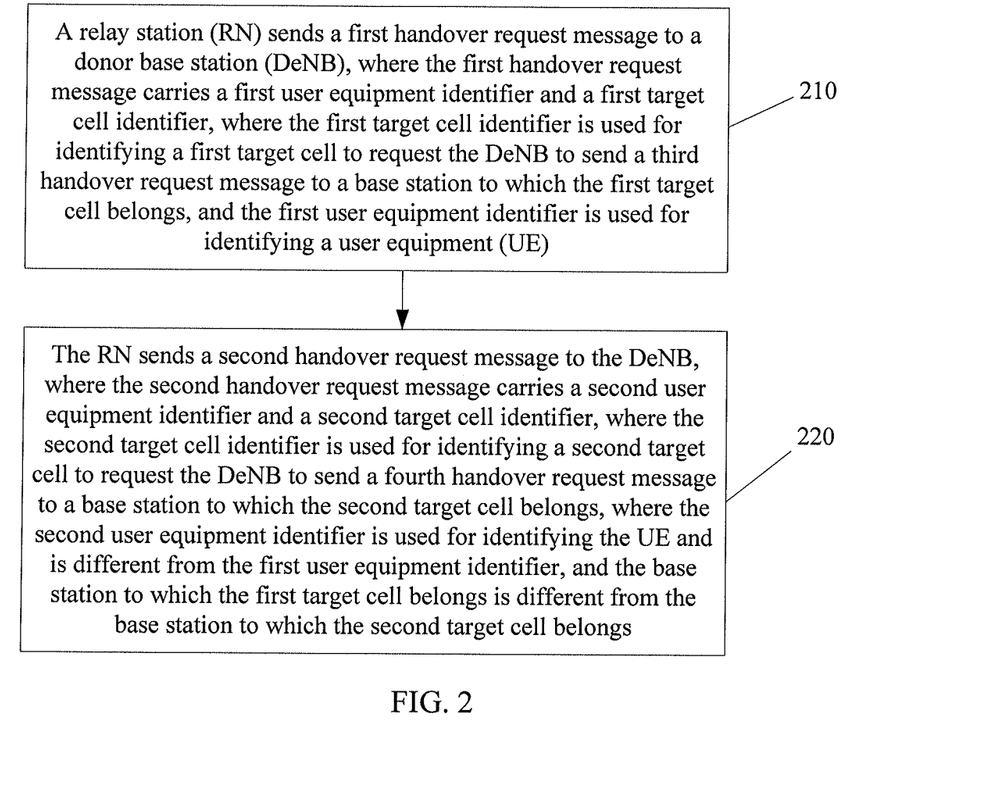
FIG. 2 is a flowchart of a method according to an embodiment of the present invention.

With reference to FIG. 2, the following describes in detail a method for handover preparation according to an embodiment of the present invention. As shown in FIG. 2, the method includes:

Step 210: An RN sends a first handover request message to a DeNB, where the first handover request message carries a first user equipment identifier and a first target cell identifier, where the first target cell identifier is used for identifying a first target cell to request the DeNB to send a third handover request message to a base station to which the first target cell belongs, and the first user equipment identifier is used for identifying a UE; for example, the base station to which the first target cell belongs may be TeNB1 in FIG. 5.

Step 220: The RN sends a second handover request message to the DeNB, where the second handover request message carries a second user equipment identifier and a second target cell identifier, where the second target cell identifier is used for identifying a second target cell to request the DeNB to send a fourth handover request message to a base station to which the second target cell belongs, where the second user equipment identifier is used for identifying the UE and is different from the first user equipment identifier, and the base station to which the first target cell belongs is different from the base station to which the second target cell belongs. For example, the base station to which the second target cell belongs may be TeNB2 in FIG. 5.

Figure 3:
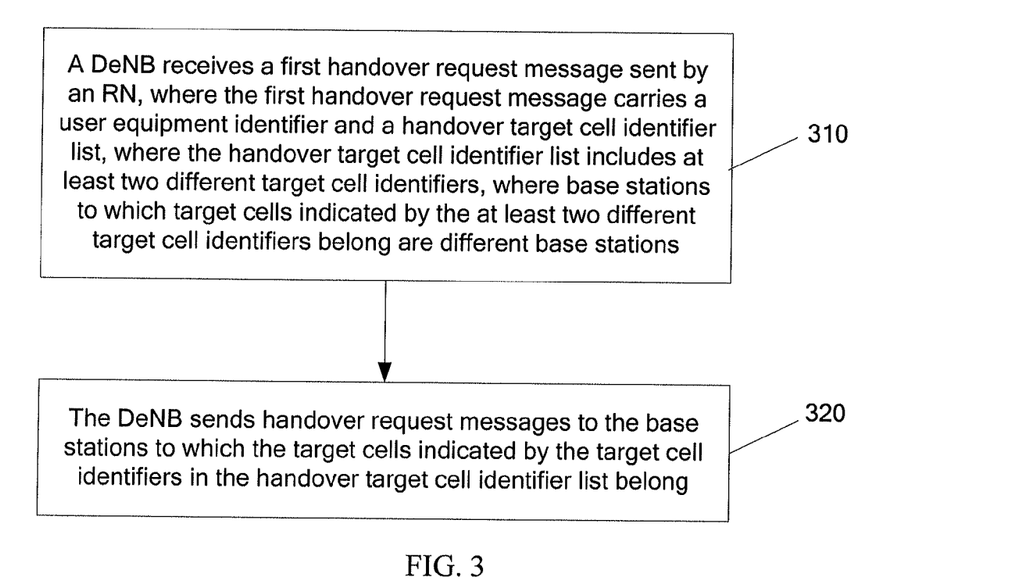
FIG. 3 is a flowchart of a method according to an embodiment of the present invention.

With reference to FIG. 3, the following describes in detail a method for handover preparation according to an embodiment of the present invention. As shown in FIG. 3, the method includes:

Step 310: A DeNB receives a first handover request message sent by an RN, where the first handover request message carries a user equipment identifier and a handover target cell identifier list, where the handover target cell identifier list includes at least two different target cell identifiers, where base stations to which target cells indicated by the at least two different target cell identifiers belong are different base stations.

Step 320: The DeNB sends handover request messages to the base stations to which the target cells indicated by the target cell identifiers in the handover target cell identifier list belong. For example, the base stations to which the target cells indicated by the target cell identifiers in the handover target cell identifier list belong may be TNeB1 and TNeB2 in FIG. 6.

Figure 4:
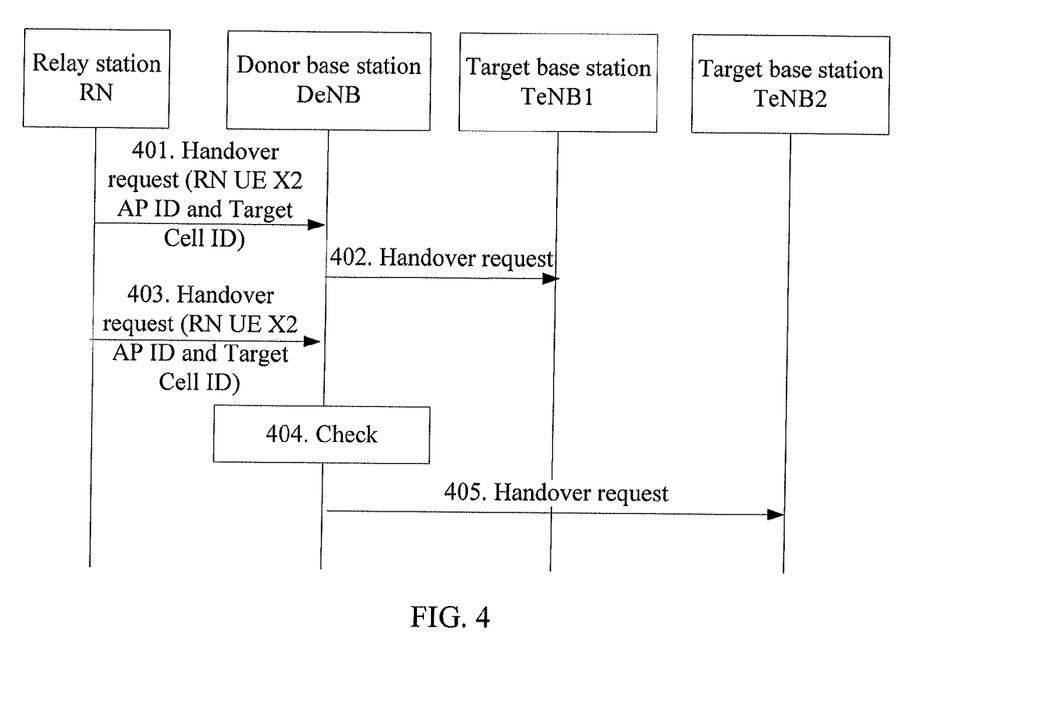
FIG. 4 is a flowchart of a method according to an embodiment of the present invention.

With reference to FIG. 4, the following describes a method for handover preparation according to an embodiment of the present invention. As shown in FIG. 4, the method includes:

Step 401: A relay station (RN) sends a handover request (Handover Request) message to a donor base station (DeNB), where the handover request message carries a first UE identifier and a first target cell identifier.

The first UE identifier may be an identity code which is allocated by the RN and can uniquely identify the UE on a relevant interface. In FIG. 4, the UE identifier may be expressed as an RN UE X2 AP ID, and may also be expressed in other modes.

The first target cell identifier may be an identity code identifying the first handover target cell. It should be noted that the identity code is used for identifying the first target cell by an entity receiving the identity code. In FIG. 4, the first target cell identifier is expressed as a Target Cell ID, and may also be expressed in other modes. The first target cell identifier may be a bit sequence of 28 bits, where the first 20 bits may be an identifier of a base station to which the handover target cell belongs.

Step 402: After receiving the Handover Request message, the DeNB sends a Handover Request message to the target base station (Target eNB, TeNB) to which the first handover target cell belongs, requesting the target base station to perform handover preparation for the UE. The target base station in FIG. 4 is expressed as TeNB1.

Specifically, the DeNB receives the Handover Request message, identifies the target base station TeNB1 by using the Target Cell ID, and sends a message to TeNB1.

Step 403: The RN sends a Handover Request to the DeNB again, where the handover request message carries a second UE identifier and a second target cell identifier.

In the embodiment of the present invention, the RN may request multiple target eNBs in parallel, such as TeNB1 and TeNB2 in this embodiment, to perform handover preparation for a same UE. From the perspective of the message, it means that when the RN sends a Handover Request message to TeNB1 but does not receive the corresponding response, the RN may also send a Handover Request message to TeNB2. In this way, more target eNBs can perform handover preparation, which increases the number of selected base stations and may improve the handover success ratio of the UE.

It is understandable that the embodiment of the present invention does not limit the number of target eNBs, that is, the number of target eNBs may be 2 or more. When there are more than 2 eNBs, the embodiment of the present invention may be still applicable.

Because the handover request and the handover request in step 401 are triggered for the same UE, the value of the second UE identifier carried in the Handover Request message is the same as the value of the first UE identifier carried in the Handover Request message in step 401. The second target cell identified by the second target cell identifier may be a cell of the target base station TeNB2.

In addition, the RN may request multiple target eNBs in parallel. Therefore, the sequence of step 403 and step 402 is not limited, that is, the DeNB may first execute step 403 and then execute step 402.

Step 404: When the DeNB receives the second Handover Request message sent by the RN, the DeNB checks the second target cell identifier carried in the message.

If it is determined that the base station to which the cell indicated by the second target cell identifier belongs is different from the base station to which the cell indicated by the first target cell identifier belongs, the DeNB determines that the request is a valid handover request, and then correspondingly processes and forwards the request.

If it is determined that the base station to which the cell indicated by the second target cell identifier belongs is the same as the base station to which the cell indicated by the first target cell identifier belongs, the DeNB determines that it is an error, and then triggers corresponding error processing, for example, the DeNB may send an error indication (Error Indication) message to the RN.

Step 405: The DeNB sends a Handover Request message to the base station TeNB2 to which the second target cell belongs, requesting TeNB2 to perform handover preparation for the UE.

In this embodiment, although the UE identifiers carried in the two handover requests are the same, the base stations to which the target cells identified by the target cell identifiers carried in the two handover requests belong are different, and therefore, the DeNB does not determine that an error occurs.

It should be noted that in a conventional handover technology, between a pair of a source base station and a target base station, parallel handover preparation processes are not allowed for a same UE. From the perspective of the message, after the target base station receives a Handover Request message from the source base station, if the target base station receives a Handover Request message from the same source base station in parallel, the target base station may check a UE identifier in the second message to determine whether the value of the UE identifier is the same as that of the UE identifier in the first message. If the values are the same, the target base station considers that the source base station is attempting to request the target base station to perform preparation for the same UE twice in parallel. The target base station regards it as an error and sends an error indication (Error Indication) message to the source base station to trigger corresponding error processing. As can be seen from the above analysis, if the prior art is directly applied to the RN, a valid handover request of the RN is determined by the DeNB as an error. Therefore, the RN cannot request multiple target eNBs in parallel to perform handover preparation for a UE, which causes the handover success ratio of the UE to decrease.

In the embodiment of the present invention, after using a new error check principle, the DeNB may effectively distinguish a valid handover request of the RN from an error behavior, so that the RN can request multiple target eNBs in parallel to perform handover preparation for a UE. Therefore, the handover success ratio of the UE rises, and unnecessary parallel processes between the same pair of X2 protocol entities may be effectively avoided.

Figure 5:
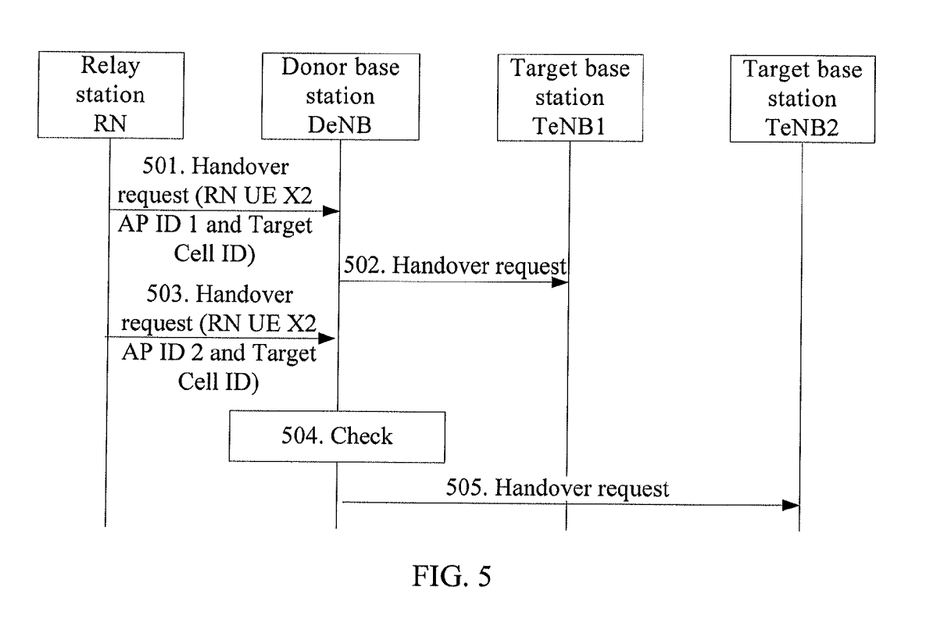
FIG. 5 is a flowchart of a method according to an embodiment of the present invention.

With reference to FIG. 5, the following describes in detail a method for handover preparation according to an embodiment of the present invention. As shown in FIG. 5, the method includes:

Steps 501 to 503 are similar to steps 401 to 403 in FIG. 5. The difference lies in that the first and second handover request messages sent by the RN carry different UE identifiers with respect to the same UE, namely, RN UE X2 AP ID 1 and RN UE X2 AP ID 2 in this embodiment. The benefit is that the Handover Request messages sent by the RN can pass the UE-identifier-based error check of the DeNB, so that those requests can be processed and forwarded by the DeNB and finally arrive at expected target eNBs (TeNB1 and TeNB2).

Step 504: After the DeNB receives the second Handover Request message sent by the RN, the DeNB first checks the UE identifier carried in the message, and when finding that the UE identifier is different from the UE identifier carried in the previous Handover Request message, the DeNB determines that the request is a valid handover request, and then, processes and forwards the request correspondingly.

Step 505 is similar to step 405 in FIG. 4, and is not described herein.

It can be seen that, in this embodiment, the RN requests multiple handover preparation processes from the DeNB in parallel for the same UE. In addition, the RN identifies the same UE by using different IDs, so that the handover requests can pass the error check of the DeNB, and the DeNB is triggered to correspondingly process and forward each request message. Therefore, the RN can request multiple target eNBs in parallel to perform handover preparation for a UE, and the handover success ratio of the UE rises.

Figure 6:
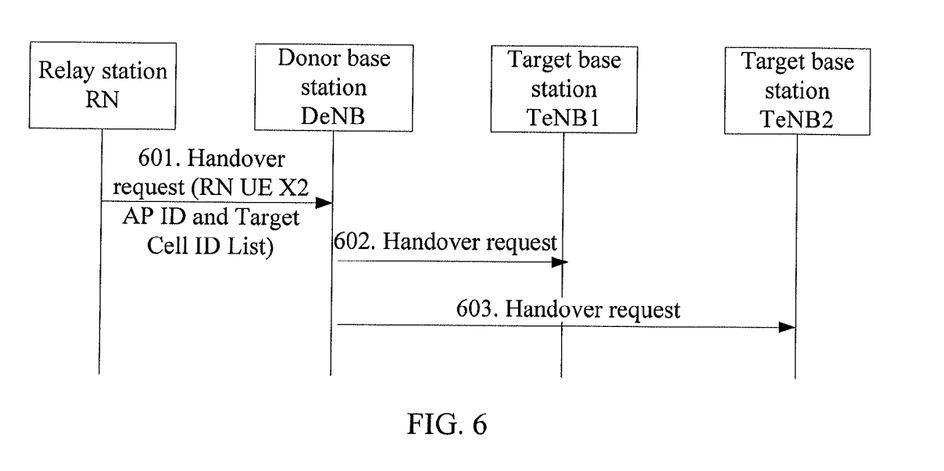
FIG. 6 is a flowchart of a method according to an embodiment of the present invention.

With reference to FIG. 6, the following describes in detail a method for handover preparation according to an embodiment of the present invention. As shown in FIG. 6, the method includes:

Step 601: An RN sends a handover request (Handover Request) message to a DeNB, where the handover request message carries a UE identifier and a handover target cell identifier list (Target Cell ID List).

The difference between this embodiment and the above embodiments lies in that the message format of the handover request (Handover Request) message is changed to include multiple target cell identifiers. When the RN needs to request multiple target eNBs in parallel to perform handover preparation for a UE, the RN only needs to send one Handover Request message to the DeNB, where the information element Target Cell ID List in the message includes all selected handover target cell identifiers.

Steps 602 and 603: After the DeNB receives the Handover Request message, the DeNB first checks the UE identifier (RN UE X2 AP ID) in the message. Because the RN only sends one Handover Request message including the RN UE X2 AP ID to the DeNB, the DeNB does not determine it as an error. Then, the DeNB checks the Target Cell ID List in the message, and if base station identifiers included in the cell identifiers included in the list are different, the DeNB determines it as a valid request, and requests in parallel base stations to which cells belongs to perform handover preparation.

It can be seen that, by limiting the message format in this embodiment, the proper parallel handover requests of the RN can pass the error check of the DeNB, so that the RN can request multiple target eNBs in parallel to perform handover preparation for a UE, and the handover success ratio of the UE rises.

Figure 7:
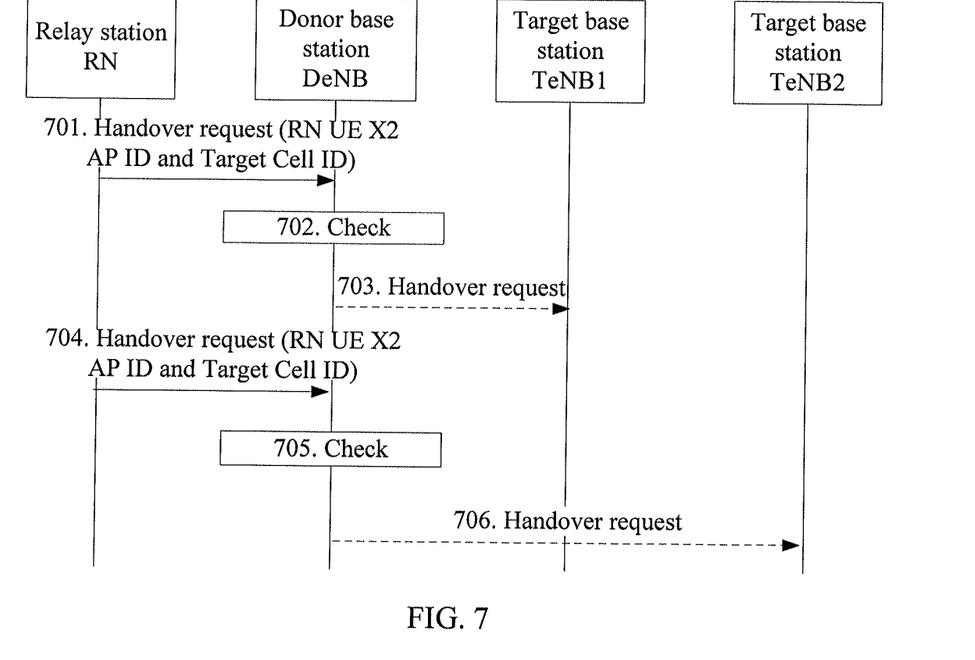
FIG. 7 is a flowchart of a method according to an embodiment of the present invention.

With reference to FIG. 7, the following describes in detail a method for handover preparation according to an embodiment of the present invention. As shown in FIG. 7, the method includes:

Step 701 is similar to step 401 in FIG. 4, and is not described herein.

Steps 702 and 703: After the DeNB receives the Handover Request message, the DeNB first checks whether the cell identified by the first target cell identifier carried in the message is a cell of the DeNB; and if so, the DeNB performs handover preparation for the UE.

If the cell identified by the first target cell identifier is a cell of other eNBs, the DeNB may correspondingly process and forward the request; in this case, the target eNB (TeNB1) finally receiving the request may perform corresponding UE-identifier-based error check for the received Handover Request message, and triggers corresponding error processing after finding an error. Specifically, the DeNB receives the Handover Request message, identifies the target base station TeNB1 by using the Target Cell ID, and sends a Handover Request message to the base station TeNB1 to which the handover target cell belongs, requesting TeNB1 to perform handover preparation for the UE.

Steps 704 to 706: After the DeNB receives the second Handover Request message sent by the RN, the processing procedure is similar to steps 702 and 703, and the DeNB needs to check whether the cell identified by the second target cell identifier carried in the message is a cell of the DeNB.

In this embodiment, the DeNB identifies the target base station TeNB2 by using the Target Cell ID, and sends a Handover Request message to the base station TeNB2 to which the handover target cell belongs, requesting TeNB2 to perform handover preparation for the UE.

Alternatively, in this embodiment, after the DeNB receives the second Handover Request message, the DeNB first checks the second target cell identifier carried in the message; if the cell identified by the second target cell identifier is a cell of the DeNB, the DeNB performs error check, that is, the DeNB may check whether the second UE identifier carried in the message is the same as the first UE identifier in the first Handover Request message, so as to prevent the RN from repeatedly requesting the DeNB to perform preparation for the same UE. That is, after the DeNB receives the second Handover Request message, the DeNB performs error check for the second UE identifier and second target cell identifier carried in the message, and if both of the following conditions are satisfied, the DeNB may determine it as an error.

If both the base station to which the second target cell identified by the second cell identifier belongs and the base station to which the first target cell identified by the first target cell identifier in step 701 belongs are the DeNB itself, and the second UE identifier is the same as the first UE identifier in step 701, the DeNB determines it as an error.

If the DeNB determines that an error occurs, the DeNB may trigger corresponding error processing, for example, the DeNB may send an error indication (Error Indication) message to the RN.

It can be seen that, by defining the error check behavior of the DeNB in this embodiment, the proper handover request of the RN can pass the error check of the DeNB, so that the RN can request multiple target eNBs in parallel to perform handover preparation for a UE, and the handover success ratio of the UE rises.

Figure 8:
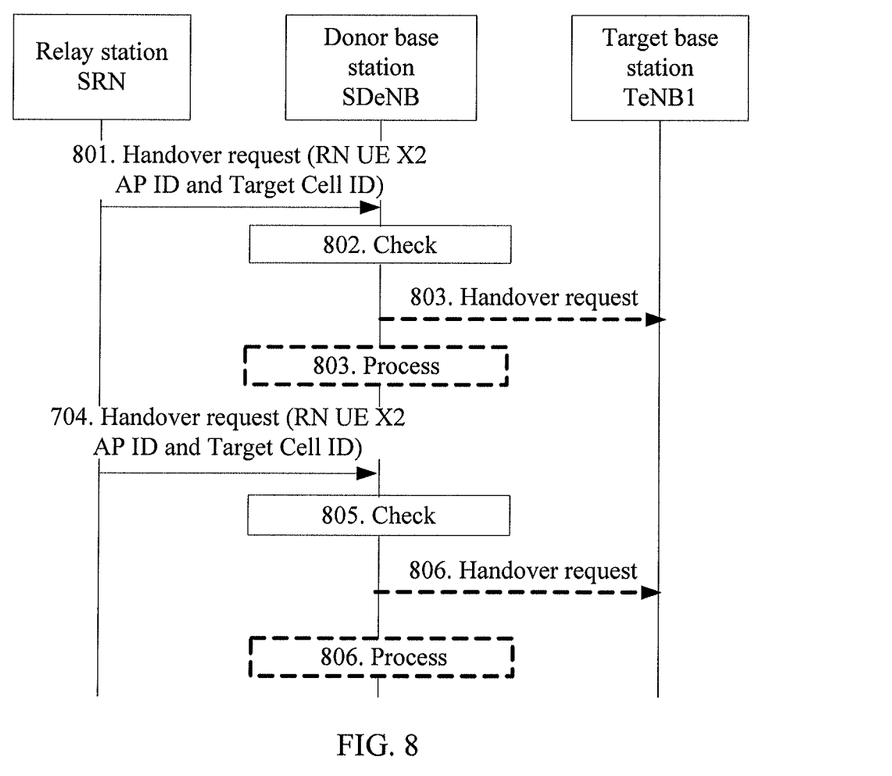
FIG. 8 is a flowchart of a method according to an embodiment of the present invention.

With reference to FIG. 8, the following describes in detail a method for handover preparation according to an embodiment of the present invention. As shown in FIG. 8, the method includes:

Step 801 is similar to step 401 in FIG. 4, and is not described herein.

Step 802: After the DeNB receives the Handover Request message, the DeNB first checks the target cell identifier carried in the message.

In this embodiment, according to different cell identifiers, the following cases may exist:

(1) If the cell identified by the cell identifier is a cell of other eNBs, the DeNB may process and forward the request correspondingly.

For example, the DeNB receives the Handover Request message, identifies the target base station TeNB1 by using the Target Cell ID, and sends a Handover Request message through step 803 to the base station TeNB1 to which the handover target cell belongs, requesting TeNB1 to perform handover preparation for the UE.

(2) If the cell identified by the cell identifier is a cell of the DeNB, through step 803', the DeNB itself performs handover preparation for the UE.

It should be noted that step 803 and step 803' may be executed alternatively according to different situations.

Steps 804 and 805: After the DeNB receives the second Handover Request message sent by the RN, the DeNB needs to execute the step of error check.

In this embodiment, the following cases may exist:

(1) The DeNB may first check the second UE identifier carried in the message, and when finding that the identifier is the same as the first UE identifier carried in the previous Handover Request message, then checks the second target cell identifier included in the second Handover Request message;

when the DeNB finds that the second target cell identifier is the same as the first target cell identifier carried in the previous Handover Request message, the DeNB reports an error. Alternatively, the DeNB may send an error indication (Error Indication) message to the RN.

When the DeNB finds that the second target cell identifier is different from the first target cell identifier carried in the previous Handover Request message, the DeNB sends a Handover Request message to the base station to which the handover target cell belongs.

For example, the DeNB receives the second Handover Request message, and identifies the target base station TeNB1 by using the Target Cell ID. If the DeNB has sent a Handover Request message to the base station TeNB1 to which the handover target cell belongs in step 803, the DeNB reports an error through step 806'. Alternatively, the DeNB may send an Error Indication message to the RN.

(2) The DeNB may first check the second target cell identifier carried in the message, and when finding that the target base station to which the target cell identified by the identifier belongs is the same as the target base station to which the target cell identified by the first target cell identifier carried in the previous Handover Request message belongs, then checks the second UE identifier included in the second Handover Request message;

when the DeNB finds that the second UE identifier is the same as the first UE identifier carried in the previous Handover Request message, the DeNB reports an error. Alternatively, the DeNB may send an error indication (Error Indication) message to the RN.

When the DeNB finds that the second UE identifier is different from the first UE identifier carried in the previous Handover Request message, the DeNB sends a Handover Request message to the base station to which the handover target cell belongs.

For example, if through step 803', the DeNB receives a second Handover Request after receiving a first Handover Request message, the DeNB first checks the second target cell identifier carried in the message. If the cell identified by the cell identifier is also a cell of the DeNB, the DeNB checks the second UE identifier carried in the message; when finding that the identifier is the same as the first UE identifier carried in the previous Handover Request message, the DeNB reports an error to prevent the RN from requesting in parallel the DeNB to perform preparation for the same UE.

If the cell identified by the second target cell identifier is not a cell of the DeNB, the DeNB determines that the request is a valid handover request, and may correspondingly process and forward the request; in this case, the target eNB (TeNB1) finally receiving the request may perform corresponding UE-identifier-based error check for the received Handover Request message, and triggers corresponding error processing after finding an error.

Figure 9:
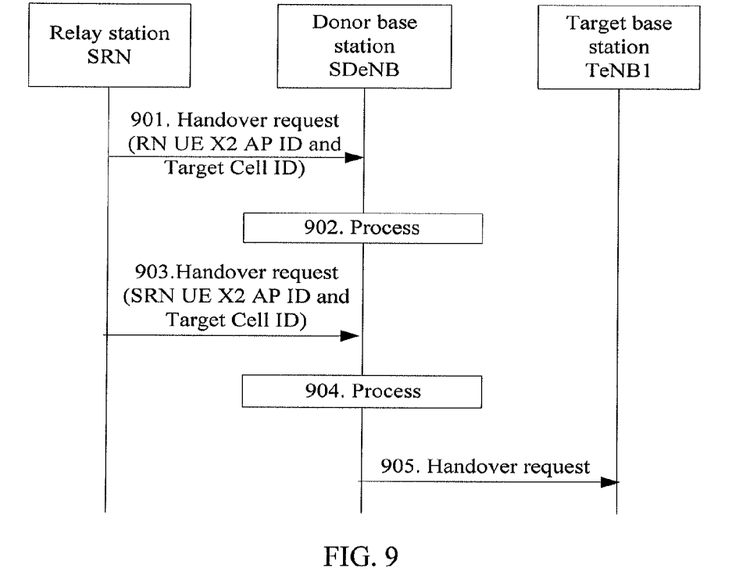
FIG. 9 is a flowchart of a method according to an embodiment of the present invention.

With reference to FIG. 9, the following describes in detail a method for handover preparation according to an embodiment of the present invention. As shown in FIG. 9, the method includes:

Step 901: An RN sends a handover request (Handover Request) message to a DeNB, where the handover request message carries a first UE identifier and a first target cell identifier (Target Cell ID).

Step 902: After the DeNB receives the Handover Request message, the DeNB checks the first target cell identifier carried in the message; in this step, a cell identified by the cell identifier is a cell of the DeNB, and the DeNB performs handover preparation for the UE.

Step 903: The RN sends a handover request (Handover Request) message to the DeNB again, where the handover request message carries a second UE identifier and a second target cell identifier, where what is identified by the target cell identifier may be a cell of the target base station TeNB1. Because both of the two handover requests are triggered for the same UE, the UE identifiers carried in the two Handover Request messages may be the same.

Step 904: After the DeNB receives the second Handover Request message sent by the RN, the DeNB first checks the second UE identifier carried in the message, and when finding that the identifier is the same as the first UE identifier carried in the previous Handover Request message, checks the second target cell identifier (Target Cell ID) included in the second Handover Request message. If determining that the base station to which the handover target cell indicated by the cell identifier belongs is not the DeNB, the DeNB determines that the request is a valid handover request, and then, may process and forward the request correspondingly.

Step 905: The DeNB sends a Handover Request message to the base station TeNB1 to which the second target cell belongs, requesting TeNB1 to perform handover preparation for the UE.

Similarly, in this embodiment, the DeNB receives a first handover request, and if finding that a handover target is TeNB1, the DeNB sends a handover request message to the TeNB1; the DeNB receives a second handover request, and then the DeNB needs to execute a check step similar to step 904, that is, the DeNB determines whether the handover target is the DeNB in a case that the second handover request is also sent for the UE, and if determining that the base station to which the handover target cell indicated by the cell identifier belongs is the DeNB, but the handover target of the first handover request is not the DeNB, the DeNB may determine that the request is a valid handover request and the DeNB itself may perform handover preparation for the UE.

It can be seen that, by changing the error check principle of the DeNB in this embodiment, the RN can request multiple target eNBs in parallel to perform handover preparation for a UE, and therefore the handover success ratio of the UE rises.

Embodiments of the present invention further provide corresponding devices so that the technical solutions provided by the foregoing embodiments of the present invention can be better implemented.

Figure 10:
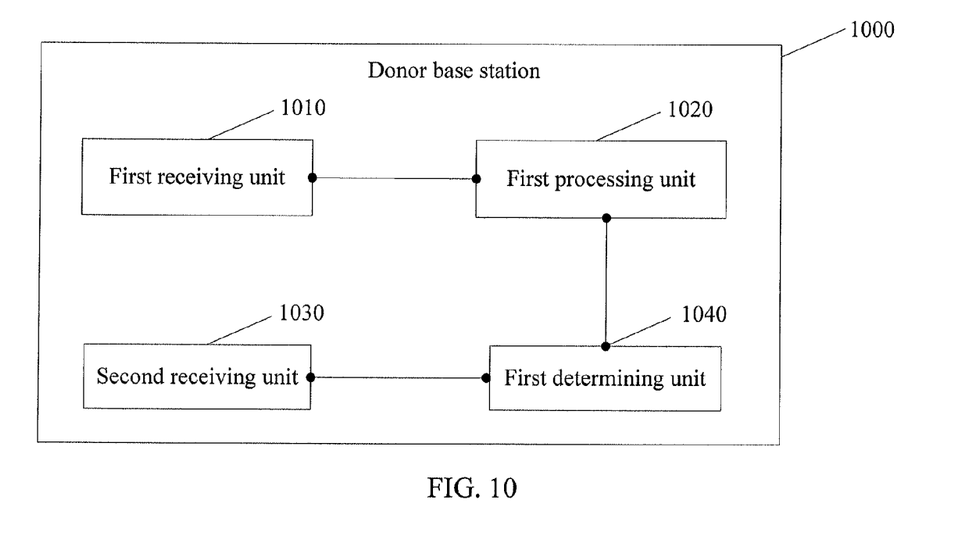
FIG. 10 is a schematic structural diagram of a donor base station according to an embodiment of the present invention.

A donor base station 1000 in an embodiment of the present invention, as shown in FIG. 10, may include:

a first receiving unit 1010, configured to receive a first handover request message sent by an RN, where the first handover request message carries a first target cell identifier and a first user equipment (UE) identifier, where the first target cell identifier is used for identifying a first target cell;

a first processing unit 1020, configured to obtain the first target cell identifier after the first receiving unit receives the first handover request message, and instruct a base station to which the first target cell belongs to perform handover preparation in the first target cell;

a second receiving unit 1030, configured to receive a second handover request message sent by the RN, where the second handover request message carries a second target cell identifier and a second UE identifier, where the second target cell identifier is used for identifying a second target cell; and a first determining unit 1040, configured to obtain the second target cell identifier after the second receiving unit 1030 receives the second handover request message, and when determining that a base station to which the second target cell indicated by the second target cell identifier belongs is different from the base station to which the first target cell indicated by the first target cell identifier obtained by the first processing unit 1020 belongs, instruct the base station to which the second target cell belongs to perform handover preparation in the second target cell.

The first processing unit 1020 further includes a first processing subunit 10201, configured to perform handover preparation in the first target cell when the base station to which the first target cell belongs is the DeNB.

The first determining unit 1040 is specifically configured to: when the base station to which the second target cell belongs is a second target base station, send a fourth handover request message to the second target base station to request the second target base station to perform handover preparation in the second target cell.

The first processing unit 1020 further includes a second processing subunit 10202, configured to: when the base station to which the first target cell belongs is a first target base station, send a third handover request message to the first target base station to request the first target base station to perform handover preparation in the first target cell.

The first determining unit 1040 is specifically configured to: when the base station to which the second target cell belongs is a second target base station, send a fourth handover request message to the second target base station to request the second target base station to perform handover preparation in the second target cell; or, when the base station to which the second target cell belongs is the DeNB, perform handover preparation in the second target cell.

A second determining unit 1040b is further included, and configured to: when determining that the base station to which the second target cell indicated by the second target cell identifier belongs is the same as the base station to which the first target cell indicated by the first target cell identifier obtained by the first processing unit 1020 belongs, and the second UE identifier received by the second receiving unit is the same as the first UE identifier received by the first receiving unit, send an error indication message to the RN.

A third determining unit 1040c is further included, and configured to: when determining that the base station to which the second target cell indicated by the second target cell identifier belongs is the same as the base station to which the first target cell indicated by the first target cell identifier obtained by the first processing unit 1020 belongs, instruct the base station to which the second target cell belongs to perform handover preparation in the second target cell.

The donor base station in this embodiment may implement a method for handover preparation. For details, reference may be made to the method embodiments described in FIG. 1, FIG. 4, FIG. 7, FIG. 8 and FIG. 10.

Figure 11:
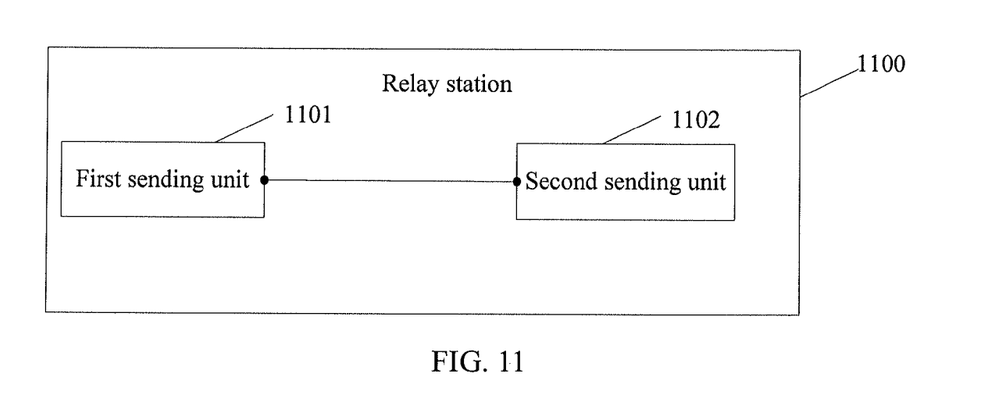
FIG. 11 is a schematic structural diagram of a relay station according to an embodiment of the present invention.

A relay station 1100 in an embodiment of the present invention, as shown in FIG. 11, may include:

a first sending unit 1101, configured to send a first handover request message to a donor base station (DeNB), where the first handover request message carries a first user equipment identifier and a first target cell identifier, where the first target cell identifier is used for identifying a first target cell to request the DeNB to send a third handover request message to a base station to which the first target cell belongs, and the first user equipment identifier is used for identifying a user equipment (UE); and a second sending unit 1102, configured to send a second handover request message to the DeNB after the first sending unit sends the first handover request message, where the second handover request message carries a second user equipment identifier and a second target cell identifier, where the second target cell identifier is used for identifying a second target cell to request the DeNB to send a fourth handover request message to a base station to which the second target cell belongs, where the second user equipment identifier is used for identifying the UE and is different from the first user equipment identifier, and the base station to which the first target cell belongs is different from the base station to which the second target cell belongs.

The relay station in this embodiment may implement a method for handover preparation. For details, reference may be made to the method embodiments described in FIG. 2 and FIG. 5.

Figure 12:
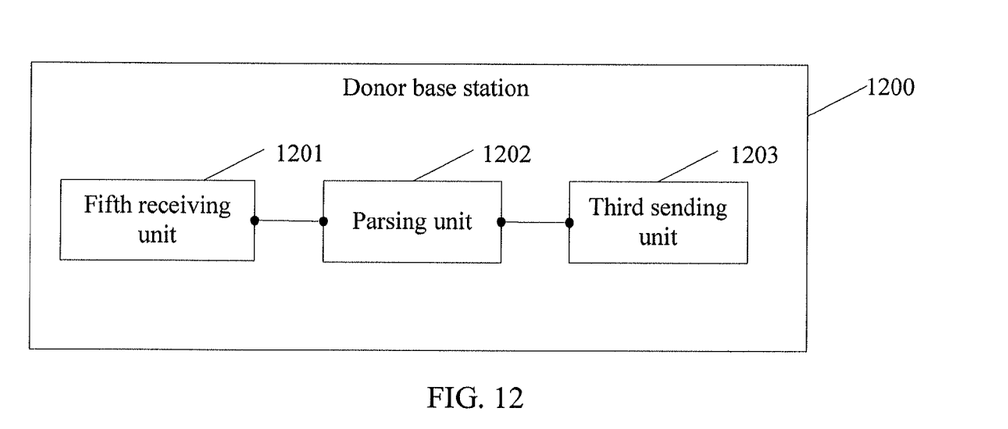
FIG. 12 is a schematic structural diagram of a donor base station according to an embodiment of the present invention.

A donor base station 1200 in an embodiment of the present invention, as shown in FIG. 12, may include:

a fifth receiving unit 1201, configured to receive a first handover request message sent by a relay station RN, where the first handover request message carries a user equipment identifier and a handover target cell identifier list, where the handover target cell identifier list includes at least two different target cell identifiers, where base stations to which target cells indicated by the at least two different target cell identifiers belong are different base stations;

a parsing unit 1202, configured to determine base stations indicated by the target cell identifiers in the handover target cell identifier list received by the fifth receiving unit; and a third sending unit 1203, configured to send, according to a result of the parsing unit, handover request messages to the base stations to which the target cells indicated by the target cell identifiers in the handover target cell identifier list belong.

The donor base station in this embodiment may implement a method for handover preparation. For details, reference may be made to the method embodiments described in FIG. 3 and FIG. 6.

The embodiments of the present invention may also be applied in the scenario of a home base station (Home eNB, HeNB). The HeNB scenario is similar to the RN scenario in the above embodiments of the present invention, where the DeNB may be replaced with a home base station gateway (Home eNB Gateway, HeNB GW), and the RN may be replaced with an HeNB. The HeNB GW is different from the DeNB, and it is not a base station and does not provide a service for a UE. Therefore, the UE may not be handed over to the HeNB GW. However, the HeNB GW is similar to the DeNB and also provides a proxy function for the X2 communication between HeNBs and between the HeNB and the eNB. The HeNB is a mini base station, and has a wired connection with the HeNB GW, which is different from the wireless connection between the RN and the DeNB. The above embodiments can be applied to the above HeNB scenario without modification, and details are not further described herein.

Persons skilled in the art should understand that the modules of the apparatus in the embodiments of the present invention are divided by functions and in practice, the function modules may be separated or combined for the specific structure.

In the foregoing embodiments of the present invention, the wording "receive" may be construed as actively obtaining information from other units or receiving information sent by other units.

Serial numbers of the foregoing embodiments of the present invention are only used for description, but do not indicate preference of the embodiments.

The technical solutions disclosed in the claims also fall within the protection scope of the embodiments of the present invention Persons of ordinary skill in the art should understand that all or part of the steps of the foregoing methods in the embodiments may be implemented by hardware following instructions of programs. The programs may be stored in a computer readable storage medium.

The foregoing description is merely about exemplary embodiments of the present invention, but is not intended to limit the protection scope of the present invention. Any modification, equivalent replacement, or improvement made within the idea and principle of the present invention shall fall within the protection scope of the present invention.

What is claimed is:

1. A method for handover preparation, comprising:
   receiving, by a donor base station (DeNB), a first handover request message sent by a relay station (RN), wherein the first handover request message carries a first target cell identifier and a first user equipment (UE) identifier, wherein the first target cell identifier is used for identifying a first target cell;
   obtaining, by the DeNB, the first target cell identifier, and instructing a base station to which the first target cell belongs to perform handover preparation in the first target cell;
   receiving, by the DeNB, a second handover request message sent by the RN, wherein the second handover request message carries a second target cell identifier and a second UE identifier, wherein the second target cell identifier is used for identifying a second target cell; and
   obtaining, by the DeNB, the second target cell identifier, and when a base station to which the second target cell belongs is different from the base station to which the first target cell belongs, instructing, by the DeNB, the base station to which the second target cell belongs to perform handover preparation in the second target cell.

2. The method according to claim 1, wherein: the instructing, by the DeNB, the base station to which the first target cell belongs to perform handover preparation in the first target cell comprises:
   when the base station to which the first target cell belongs is the DeNB, performing, by the DeNB, handover preparation in the first target cell; and
   when the base station to which the second target cell belongs is different from the base station to which the first target cell belongs, the instructing, by the DeNB, the base station to which the second target cell belongs to perform handover preparation in the second target cell comprises:
   when the base station to which the second target cell belongs is a second target base station, sending, by the DeNB, a fourth handover request message to the second target base station to request the second target base station to perform handover preparation in the second target cell.

3. The method according to claim 1, wherein: the instructing, by the DeNB, the base station to which the first target cell belongs to perform handover preparation in the first target cell comprises:
   when the base station to which the first target cell belongs is a first target base station, sending, by the DeNB, a third handover request message to the first target base station to request the first target base station to perform handover preparation in the first target cell; and
   when the base station to which the second target cell belongs is different from the base station to which the first target cell belongs, the instructing, by the DeNB, the base station to which the second target cell belongs to perform handover preparation in the second target cell comprises:
   when the base station to which the second target cell belongs is a second target base station, sending, by the DeNB, a fourth handover request message to the second target base station to request the second target base station to perform handover preparation in the second target cell; or
   when the base station to which the second target cell belongs is the DeNB, performing, by the DeNB, handover preparation in the second target cell.

4. The method according to claim 1, further comprising:
   when the base station to which the second target cell belongs is the same as the base station to which the first target cell belongs and the second UE identifier is the same as the first UE identifier, sending, by the DeNB, an error indication message to the RN.

5. The method according to claim 2, further comprising:
   when the base station to which the second target cell belongs is the same as the base station to which the first target cell belongs and the second UE identifier is the same as the first UE identifier, sending, by the DeNB, an error indication message to the RN.

6. The method according to claim 3, further comprising:
   when the base station to which the second target cell belongs is the same as the base station to which the first target cell belongs and the second UE identifier is the same as the first UE identifier, sending, by the DeNB, an error indication message to the RN.

7. The method according to claim 1, further comprising:
when the base station to which the second target cell belongs is the same as the base station to which the first target cell belongs, instructing, by the DeNB, the base station to which the second target cell belongs to perform handover preparation in the second target cell.

8. The method according to claim 2, further comprising:
when the base station to which the second target cell belongs is the same as the base station to which the first target cell belongs, instructing, by the DeNB, the base station to which the second target cell belongs to perform handover preparation in the second target cell.

9. The method according to claim 3, further comprising:
when the base station to which the second target cell belongs is the same as the base station to which the first target cell belongs, instructing, by the DeNB, the base station to which the second target cell belongs to perform handover preparation in the second target cell.

10. A method for handover preparation, comprising:
sending, by a relay station (RN), a first handover request message to a donor base station (DeNB), wherein the first handover request message carries a first user equipment identifier and a first target cell identifier, wherein the first target cell identifier is used for identifying a first target cell to request the DeNB to send a third handover request message to a base station to which the first target cell belongs, and the first user equipment identifier is used for identifying a user equipment (UE); and
sending, by the RN, a second handover request message to the DeNB, wherein the second handover request message carries a second user equipment identifier and a second target cell identifier, wherein the second target cell identifier is used for identifying a second target cell to request the DeNB to send a fourth handover request message to a base station to which the second target cell belongs, wherein the second user equipment identifier is used for identifying the UE and is different from the first user equipment identifier, and the base station to which the first target cell belongs is different from the base station to which the second target cell belongs.

11. A donor base station (DeNB), comprising:
a first receiving unit, configured to receive a first handover request message sent by a relay station (RN), wherein the first handover request message carries a first target cell identifier and a first user equipment (UE) identifier, wherein the first target cell identifier is used for identifying a first target cell;
a first processing unit, configured to obtain the first target cell identifier after the first receiving unit receives the first handover request message, and instruct a base station to which the first target cell belongs to perform handover preparation in the first target cell;
a second receiving unit, configured to receive a second handover request message sent by the RN, wherein the second handover request message carries a second target cell identifier and a second UE identifier, wherein the second target cell identifier is used for identifying a second target cell; and
a first determining unit, configured to obtain the second target cell identifier after the second receiving unit receives the second handover request message, and when determining that a base station to which the second target cell indicated by the second target cell identifier belongs is different from the base station to which the first target cell indicated by the first target cell identifier obtained by the first processing unit belongs, instruct the base station to which the second target cell belongs to perform handover preparation in the second target cell.

12. The donor base station according to claim 11, wherein:
the first processing unit comprises a first processing subunit, configured to perform handover preparation in the first target cell when the base station to which the first target cell belongs is the DeNB; wherein
the first determining unit is specifically configured to: when the base station to which the second target cell belongs is a second target base station, send a fourth handover request message to the second target base station to request the second target base station to perform handover preparation in the second target cell.

13. The donor base station according to claim 11, wherein:
the first processing unit comprises a second processing subunit, configured to: when the base station to which the first target cell belongs is a first target base station, send a third handover request message to the first target base station to request the first target base station to perform handover preparation in the first target cell; wherein
the first determining unit is specifically configured to: when the base station to which the second target cell belongs is a second target base station, send a fourth handover request message to the second target base station to request the second target base station to perform handover preparation in the second target cell; or when the base station to which the second target cell belongs is the DeNB, perform handover preparation in the second target cell.

14. The donor base station according to claim 11, further comprising:
a second determining unit, configured to: when determining that the base station to which the second target cell indicated by the second target cell identifier belongs is the same as the base station to which the first target cell indicated by the first target cell identifier obtained by the first processing unit belongs, and the second UE identifier received by the second receiving unit is the same as the first UE identifier received by the first receiving unit, send an error indication message to the RN.

15. The donor base station according to claim 12, further comprising:
a second determining unit, configured to: when determining that the base station to which the second target cell indicated by the second target cell identifier belongs is the same as the base station to which the first target cell indicated by the first target cell identifier obtained by the first processing unit belongs, and the second UE identifier received by the second receiving unit is the same as the first UE identifier received by the first receiving unit, send an error indication message to the RN.

16. The donor base station according to claim 13, further comprising:
a second determining unit, configured to: when determining that the base station to which the second target cell indicated by the second target cell identifier belongs is the same as the base station to which the first target cell indicated by the first target cell identifier obtained by the first processing unit belongs, and the second UE identifier received by the second receiving unit is the same as the first UE identifier received by the first receiving unit, send an error indication message to the RN.

17. The donor base station according to claim 11, further comprising:

a third determining unit, configured to: when determining that the base station to which the second target cell indicated by the second target cell identifier belongs is the same as the base station to which the first target cell indicated by the first target cell identifier obtained by the first processing unit belongs, instruct the base station to which the second target cell belongs to perform handover preparation in the second target cell.

18. The donor base station according to claim 12, further comprising:
a third determining unit, configured to: when determining that the base station to which the second target cell indicated by the second target cell identifier belongs is the same as the base station to which the first target cell indicated by the first target cell identifier obtained by the first processing unit belongs, instruct the base station to which the second target cell belongs to perform handover preparation in the second target cell.

19. The donor base station according to claim 13, further comprising:
a third determining unit, configured to: when determining that the base station to which the second target cell indicated by the second target cell identifier belongs is the same as the base station to which the first target cell indicated by the first target cell identifier obtained by the first processing unit belongs, instruct the base station to which the second target cell belongs to perform handover preparation in the second target cell.

20. A relay station, comprising:
a first sending unit, configured to send a first handover request message to a donor base station (DeNB), wherein the first handover request message carries a first user equipment identifier and a first target cell identifier, wherein the first target cell identifier is used for identifying a first target cell to request the DeNB to send a third handover request message to a base station to which the first target cell belongs, and the first user equipment identifier is used for identifying a user equipment (UE); and
a second sending unit, configured to send a second handover request message to the DeNB after the first sending unit sends the first handover request message, wherein the second handover request message carries a second user equipment identifier and a second target cell identifier, wherein the second target cell identifier is used for identifying a second target cell to request the DeNB to send a fourth handover request message to a base station to which the second target cell belongs, wherein the second user equipment identifier is used for identifying the UE and is different from the first user equipment identifier, and the base station to which the first target cell belongs is different from the base station to which the second target cell belongs.

* * * * *